US010800099B2

(12) United States Patent
Nicklas et al.

(10) Patent No.: US 10,800,099 B2
(45) Date of Patent: Oct. 13, 2020

(54) BUILD PLATE SYSTEM FOR A HEATED DEPOSITION THREE-DIMENSIONAL PRINTER AND METHOD FOR OPERATING THE SAME

(71) Applicants: John Matthew Nicklas, Ann Arbor, MI (US); Anna Michelle Nicklas, Ann Arbor, MI (US)

(72) Inventors: John Matthew Nicklas, Ann Arbor, MI (US); Anna Michelle Nicklas, Ann Arbor, MI (US)

(73) Assignees: John Matthew Nicklas, Ann Arbor, MI (US); Anna Michelle Nicklas, Ann Arbor, MI (US)

( * ) Notice: Subject to any disclaimer, the term of this patent is extended or adjusted under 35 U.S.C. 154(b) by 294 days.

(21) Appl. No.: 15/668,811

(22) Filed: Aug. 4, 2017

(65) Prior Publication Data
US 2019/0039304 A1  Feb. 7, 2019

(51) Int. Cl.
*B29C 64/245* (2017.01)
*B29C 64/209* (2017.01)
*B33Y 30/00* (2015.01)
*B29C 64/393* (2017.01)
*B33Y 50/02* (2015.01)
*B33Y 10/00* (2015.01)
*B29C 64/295* (2017.01)
*B33Y 70/00* (2020.01)

(52) U.S. Cl.
CPC .......... *B29C 64/245* (2017.08); *B29C 64/209* (2017.08); *B29C 64/393* (2017.08); *B33Y 10/00* (2014.12); *B33Y 30/00* (2014.12); *B33Y 50/02* (2014.12); *B29C 64/295* (2017.08); *B33Y 70/00* (2014.12)

(58) Field of Classification Search
CPC ....... B29C 64/245; B29C 64/209; B65H 3/20; B65G 59/02; B33Y 30/00
USPC ................................ 414/796.5, 796.7, 796.9
See application file for complete search history.

(56) References Cited

U.S. PATENT DOCUMENTS

| 2015/0037527 A1* | 2/2015 | Jacobs | B33Y 30/00 |
| | | | 428/41.7 |
| 2015/0314527 A1 | 11/2015 | Kline | |
| 2016/0082670 A1* | 3/2016 | Paroda | B29C 37/0003 |
| | | | 425/375 |

(Continued)

FOREIGN PATENT DOCUMENTS

WO  WO-2017209337 A1 * 12/2017 ............. B29C 67/00

*Primary Examiner* — Robert B Davis
(74) *Attorney, Agent, or Firm* — Darrow Mustafa PC

(57) ABSTRACT

A build plate system for a heated deposition three-dimensional printer includes a plurality of sheets, the plurality of sheets arranged in a stack on a build plate and a glue portion between each of the plurality of sheets. The glue portion is configured to hold a sheet to the stack and release the sheet from the stack when receiving heat from a nozzle of the three-dimensional printer. A method for operating a build plate system includes the steps of printing an object onto a top-most sheet of a plurality of sheets arranged in a stack, positioning the nozzle of the three-dimensional printer in thermal contact with the glue portion, applying heat to the glue portion by nozzle to release the top-most sheet from the stack, and moving the top-most sheet off of the stack into a target area using different methods of placing the nozzle into contact with the top-most sheet from the stack.

27 Claims, 13 Drawing Sheets

(56) References Cited

U.S. PATENT DOCUMENTS

| | | | |
|---|---|---|---|
| 2016/0185041 A1* | 6/2016 | Lisagor | B29C 70/78 264/257 |
| 2018/0022044 A1* | 1/2018 | Dulkiewicz | B29C 64/00 425/375 |
| 2018/0117844 A1* | 5/2018 | Sieradzki | B29C 64/393 |

* cited by examiner

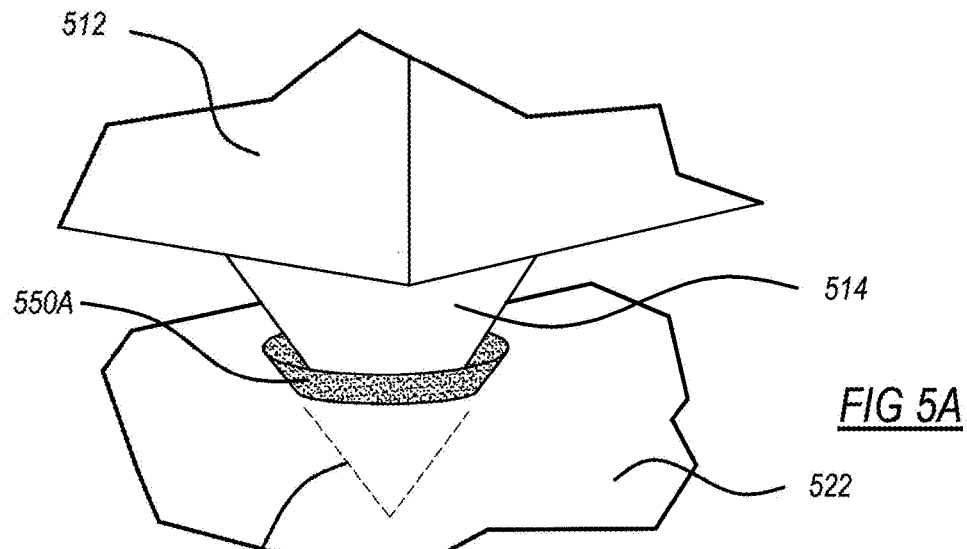
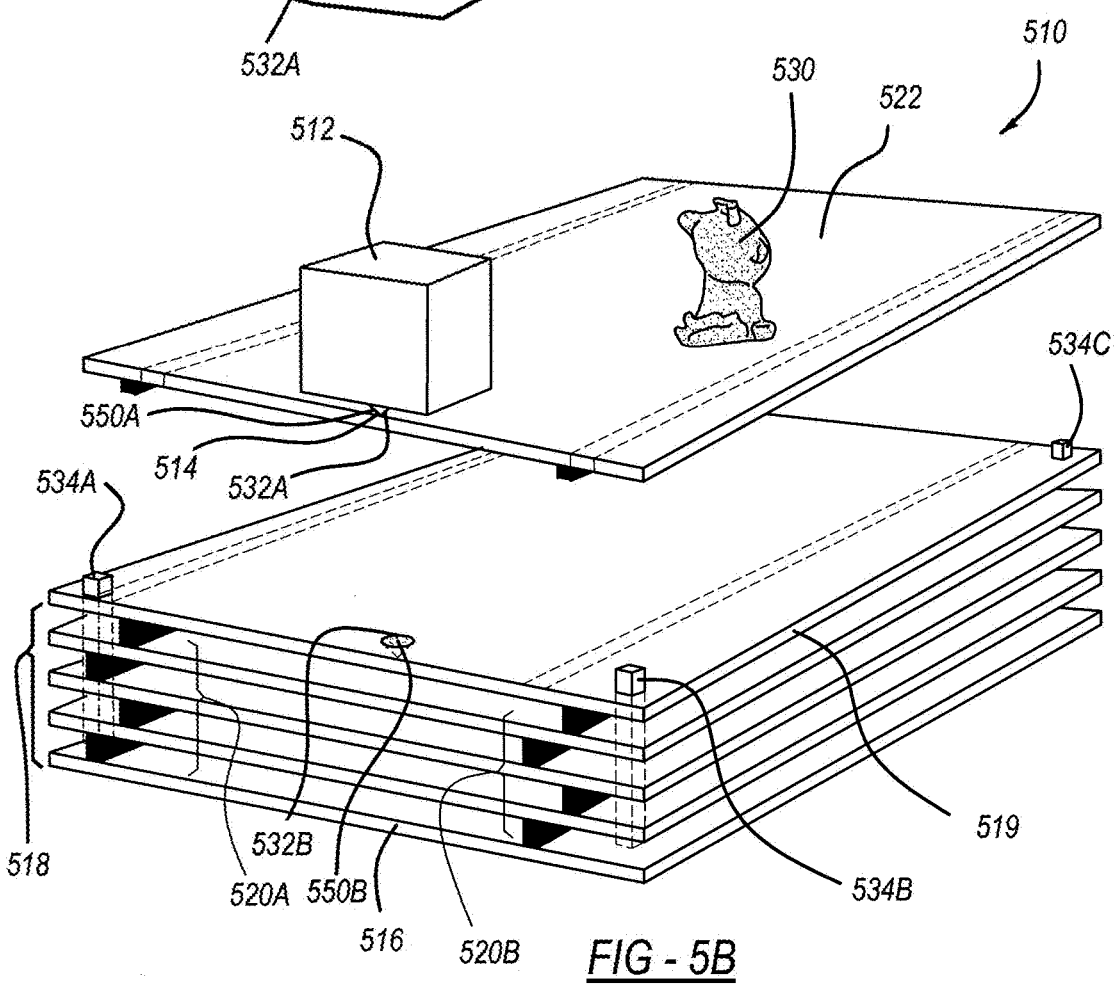

BUILD PLATE SYSTEM FOR A HEATED DEPOSITION THREE-DIMENSIONAL PRINTER AND METHOD FOR OPERATING THE SAME

BACKGROUND

1. Field of the Invention

The invention relates to build plate systems for three-dimensional printers and more particularly to build plate systems for heated deposition three-dimensional printers.

2. Description of Related Art

Three-dimensional printers can build three-dimensional structures through the deposition or binding of materials in layers. One type of three-dimensional printer is a heated deposition three-dimensional printer. The heated deposition three-dimensional printer generally includes a build plate for building three-dimensional objects. The hot material is deposited on the build plate by a nozzle of the three-dimensional printer and sticks to either the build plate or the cooled layers of material below. In many cases, the nozzle of the three-dimensional printer is capable of moving in an X and Y direction, while the build plate moves up and down, in a Z direction. Some three-dimensional printers move the nozzle in all three directions: X, Y, and Z. Other three-dimensional printers move the nozzle in only one direction, while the build plate moves in the other two directions. And yet other three-dimensional printers have a fixed nozzle and a build plate moves in all three directions: X, Y, and Z.

The nozzle of the three-dimensional printer is connected to a control module that can instruct the nozzle to heat up to a temperature capable of softening the build material. Once the nozzle is heated to an appropriate temperature, the build material is dispensed through the nozzle onto the build plate so as to build the three-dimensional object.

However, if one desires to print multiple three-dimensional objects on separate build plates, each object must be manually removed from the three-dimensional printer, typically by scraping it off of the build plate or using a chemical solvent. This manual removal of the object can cause a delay in the printing of multiple objects on multiple build plates. In addition, there is a substantial risk that the printed object may be damaged in the process of manual removal. Currently, the design of the build plate is a compromise between allowing easy removal of printed objects and allowing the first layer of hot deposited material to bind strongly enough to prevent sliding or warping of the object during printing.

SUMMARY

A build plate system for a heated deposition three-dimensional printer includes a plurality of sheets, the plurality of sheets arranged in a stack on a build plate, an attachment means to hold each sheet to the stack and release the sheet from the stack when a nozzle of the three-dimensional printer performs a specific action, and a removal means by which each sheet is moved off of the stack by a specific action of the nozzle of the three-dimensional printer. All elements of this build plate system may be passive. Hence, this system can simply replace an existing build plate without need for additional powered mechanisms.

One method for attaching each sheet to the stack in this system involves thermally sensitive glue. This glue initially affixes each sheet to the stack below. Once an object is printed onto a top-most sheet of the stack, the nozzle of the three-dimensional printer is positioned in thermal contact with the glue portion, applying heat to the glue portion by the nozzle to release the top-most sheet from the stack.

Another attachment method involves the use of mechanical latches. One or more latches initially attach each sheet to either the stack or to a frame surrounding the stack. Once an object is printed onto the top-most sheet in the stack, the nozzle of the three-dimensional printer moves into mechanical contact with each latch and applies force in such a way as to release the latch. After all of the latches holding the top-most sheet in place have been unlatched, the top-most sheet is released from the stack.

Yet another attachment method involves the use of tabs. One or more tabs initially attach each sheet to either the stack or to a rigid frame surrounding the stack. Once an object is printed onto the top-most sheet in the stack, the nozzle of the three-dimensional printer moves into mechanical and thermal contact with each tab and applies both heat and force in such a way as to break apart the tab. After all of the tabs holding the top-most sheet in place have been broken, the top-most sheet is released from the stack.

One means for removing the released top-most sheet from the stack involves positioning the nozzle of the three-dimensional printer into mechanical contact with the top-most sheet, and simply repositioning the nozzle of the three-dimensional printer so as to push the top-most sheet off of the stack into a target area.

Another removal means utilizes the properties of hot-melt adhesive. It is operated by bonding the top-most sheet to the nozzle of the three dimensional printer when the nozzle comes into contact with the hot melt adhesive, repositioning the top-most sheet bonded to the nozzle to a target area by repositioning the nozzle, and releasing the top-most sheet bonded to the nozzle by dispensing material for printing by the nozzle.

Yet another removal means takes advantage of the fact that the nozzle of the three-dimensional printer can be cooled and then re-heated. This removal means involves positioning the nozzle close to the top-most sheet and dispensing a portion of hot material for printing, bonding the top-most sheet to the nozzle by allowing the nozzle and dispensed material to cool, repositioning the top-most sheet bonded to the nozzle to a target area by repositioning the nozzle, and releasing the top-most sheet bonded to the nozzle by applying heat to the nozzle, causing the dispensed material to again become soft.

Two additional removal means involve the use of springs and angled ramps to push the released top-most sheet off of the stack via elastic force and gravity respectively.

Further objects, features, and advantages of this invention will become readily apparent to persons skilled in the art after a review of the following description, with reference to the drawings and claims that are appended to and form a part of this specification.

BRIEF DESCRIPTION OF THE DRAWINGS

FIGS. 5A-5D illustrate a build plate system with a removal means wherein the top-most sheet is bonded to the nozzle by a hot melt adhesive;

DETAILED DESCRIPTION

Figure 1:
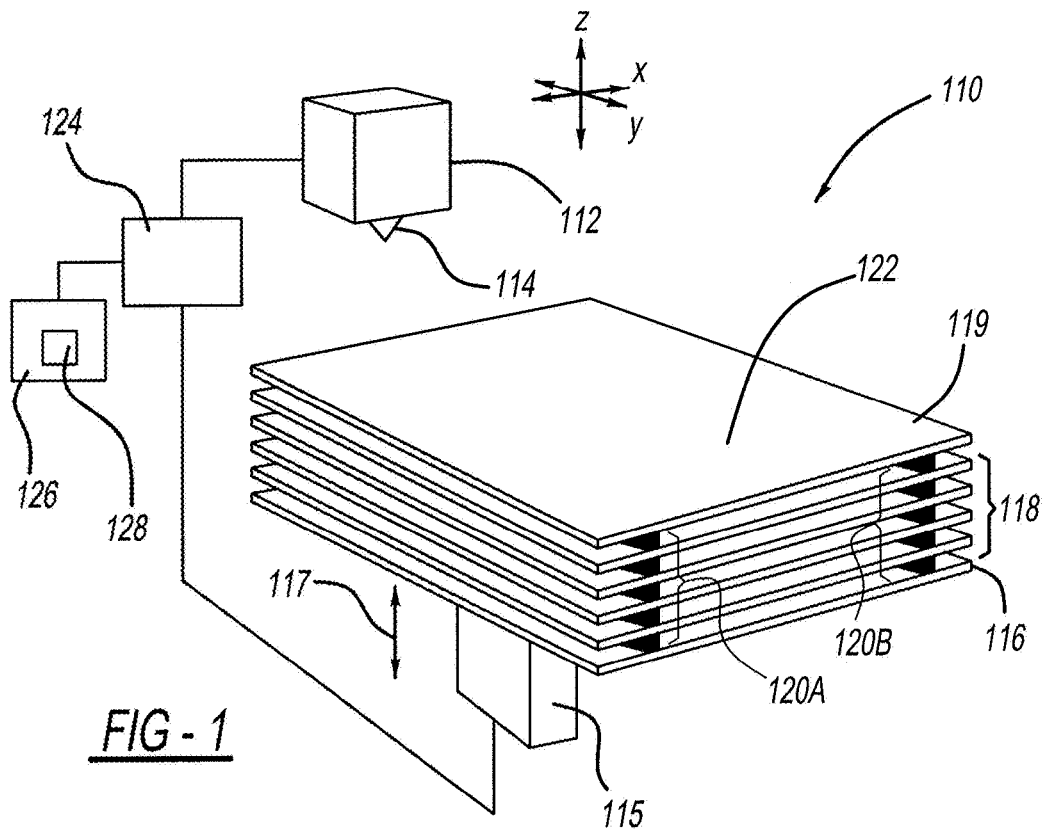
FIG. 1 illustrates a build plate system with a general control method and a glue attachment method wherein each glue portion between each of a plurality of sheets is located in the same area of each sheet for simplicity.

Referring now to FIG. 1, a build plate system 110 for a heated deposition three-dimensional printer is shown. As explained in the background section, the three-dimensional printer may include a nozzle 114 for dispensing materials to build a three-dimensional object. The nozzle 114 is supported by a structure 112. The three-dimensional object can be built on a support plate 116. The structure 112 moves in the X and Y direction, so as to move the nozzle 114 in the X and Y direction when depositing material for building the three-dimensional object.

The structure 112 may also move in the Z direction, thereby moving the nozzle 114 in the Z direction when printing the three-dimensional object. However, in this embodiment, the support plate 116 is connected to a motor 115 capable of moving the support plate 116 in the Z direction 117. The motor 115, the structure 112, and the nozzle 114 may be connected to a control module 124. The control module 124 may, in turn, be connected to a memory 126, which contains software 128 for instructing and configuring the control module 124 to move the structure 112 and the motor 115 so as to allow the printing of a three-dimensional object. Also, the control module is configured to heat the nozzle 114 and dispense material for the printing of the three-dimensional object.

The build plate system 110 includes a plurality of sheets 118 arranged in a stack 119. The plurality of sheets 118 includes a top most sheet 122. Glue portions 120A and 120B are located between each of the plurality of sheets 118 and are configured to hold each sheet of the plurality of sheets 118 to the stack 119. Generally, each sheet of the plurality of sheets 118 is made of a rigid or semi-rigid material and may be substantially rectangular. The plurality of sheets 118 may have a texture so as to maximize adhesion of material deposited to build the three-dimensional object. Also, each sheet of the plurality of sheets 118 may be configured to be cut with scissors or a laser cutter, allowing a printed object to be separated from a bulk of a used sheet.

The glue 120A and 120B may be located at any part of the plurality of sheets 118. In this embodiment, the glue 120A and 120B are located on opposing sides of the plurality of sheets 118 in a similar area of each sheet. The glue portions 120A and 120B utilize a glue that is configured to release a sheet from the stack 119 when receiving heat from the nozzle 114 of the three-dimensional printer. As the nozzle 114 moves along the upper surface of the top most sheet 122, the heat that it produces permeates that a portion of the top most sheet 122 and raises the bead of glue on the underside most that portion of sheet 122 to above the temperature at which that glue will release. By so doing, the top most sheet 122 can be easily removed from the stack 119 so as to allow the printing of another three-dimensional object. The glue of the glue portion 120A and 120B may comprise a cyanoacrylate, methacrylate, or any other heat sensitive adhesive.

To accommodate the stack 119, the control module 124 of the three-dimensional printer is configured by the software 128 so as to accommodate the stack 119. The control module 124 may be configured by pre-existing software commands to control the printing of the object by the three-dimensional printer. The control module 124 may also be configured to generate initial commands to change the height of the build plate system 110 to account for the number of used sheets in the stack 119. Furthermore, as will be explained later in this description, the control module 124 may be configured to generate commands after the object has finished printing on the top most sheet 122 so as to reposition the top most sheet 122 to a target area and release the sheet.

Figure 2:
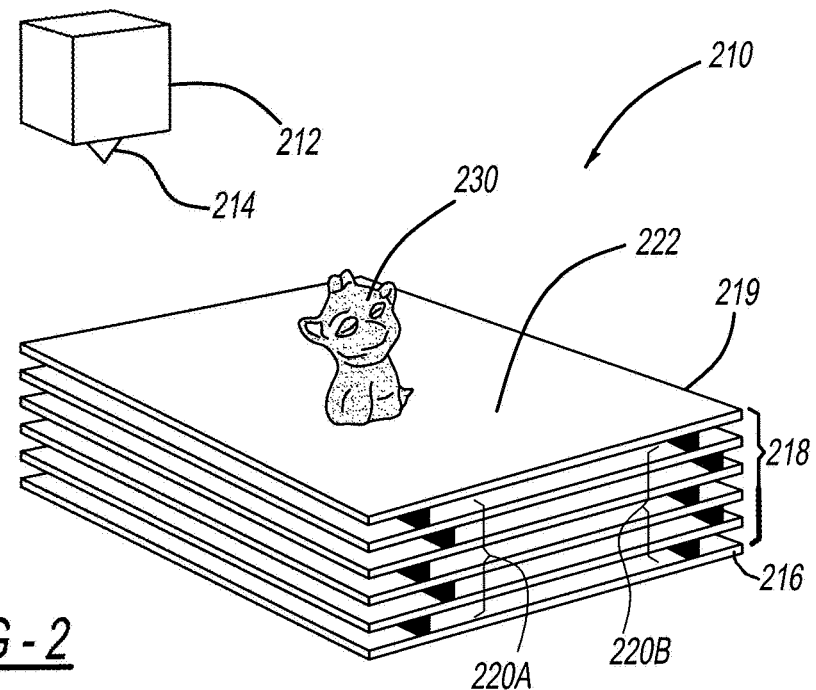
FIG. 2 illustrates a build plate system with a glue attachment method, wherein each glue portion between each of the plurality of sheets alternates between different areas of the sheets.

Referring to FIG. 2, another embodiment of the build plate system 210 is shown. In this embodiment, as well as other embodiments described in this description, like reference numerals have been used to refer to like components, with the exception that the reference numerals have been increased by 100 so as to agree with the figure numbers. In this embodiment, the glue portions 220A and 220B between each of the plurality of sheets 218 are located in a different area of the sheets so as to alternate from one location to another from each sheet. This is done to prevent the heat produced by nozzle 214 from permeating into the stack of sheets 219 and releasing additional sheets beyond the topmost sheet 222. Furthermore, in this embodiment, the three-dimensional printed object 230 is shown. Note that the three-dimensional printed object 230 is securely fixed to the top-most sheet 222, which has prevented it from warping or slipping during the printing process.

Figure 3:
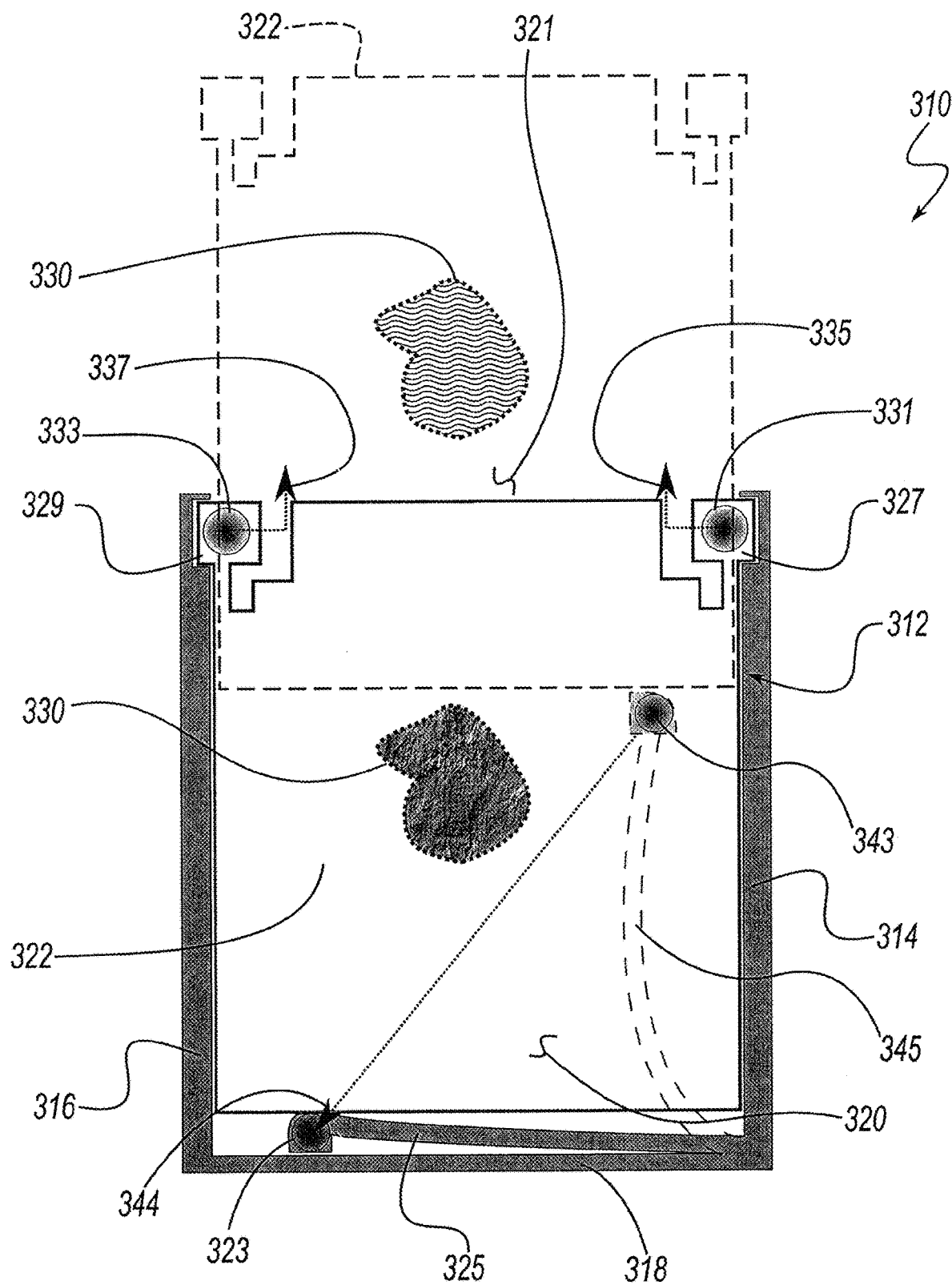
FIG. 3 illustrates a top-down view of both a build plate system wherein latches attach the sheets to a frame having side rails, and a removal means wherein the sheets are removed from the stack by a spring.

Referring to FIG. 3, another embodiment of the build plate system 310 is shown. Here, the build plate system includes a frame 312. The frame 312 may include sidewalls 314 and 316 that generally oppose one another. The frame 312 may optionally also include a back wall 318. Generally opposing the back wall 318 is an opening 321. The frame 312 generally defines a cavity 320 in which one or more sheets 322 are located within, wherein the frame 312 secures the sheets 322 in the form of a stack laterally.

The three-dimensional printer has the ability to print the printed object 330 on the sheet 322. Located within the cavity 320 is a flat spring 325. Note that this flat spring 325 is drawn for simplicity—a compression coil spring and a lever may replace it. The flat spring 325 may be connected to a concave plate 323. The flat spring 325 using the concave plate 323 biases the sheet 322 towards the opening 321. Once the sheet 322 has been pushed through the opening 321, the flat spring will assume the position 345 drawn in dashes, and the concave plate will assume the position 343 drawn in dashes. The flat spring 325 may be configured such that is operates on the top most sheet 322. The flat spring 325 and concave plate 323 may be configured such that they are re-cocked to the next sheet by action of a nozzle of the three-dimensional printer. Once the top sheet 322 is pushed through the opening 321, the conical nozzle of the three-dimensional printer will mate with the concave plate drawn at 343 and travel along a path shown by arrow 344. This will move the flat spring 325 from position 345 back to its original position 325 and allow another sheet to move up from below.

The frame 312 may also define at least one slot 327 formed within the sidewall 314. Additionally or alternatively, the other sidewall 316 may have a slot 329 located within. The sheet 322 may have latches 331 and/or 333 configured so as to engage the slots 327 and/or 329 of the sidewalls 314 and 316, respectively. When the latches 331 and/or 333 engage the slots 327 and/or 329, the sheet 322 is firmly held in place within the cavity 320 so that the spring 325 cannot push the sheet 322 out of the cavity 320 towards the opening 321.

In order to release the sheet 322, the latches 331 and/or 333 must be actuated so that they move towards an opening located and defined by the sheet 322. The actuation of the latches 331 and 333 is shown by arrows 335 and 337. The actuation of the latches 331 and 333 can be accomplished by utilizing the nozzle of the three-dimensional printer to actuate the latches 331 and/or 333, in a manner identical to that described for the re-cocking of the flat spring 323. Additionally, it is possible that these latches 331 and/or 333 may be actuated by any device capable of actuating the latches 331 and/or 333.

After actuating the latches 331 and/or 333, the sheet 322 having the printed object 330 will move towards the opening 321 because the flat spring 323 biases the sheet 322 towards the opening 321. After that, the printed object 330 that is on the now ejected sheet 322 may be processed further.

Figure 4:
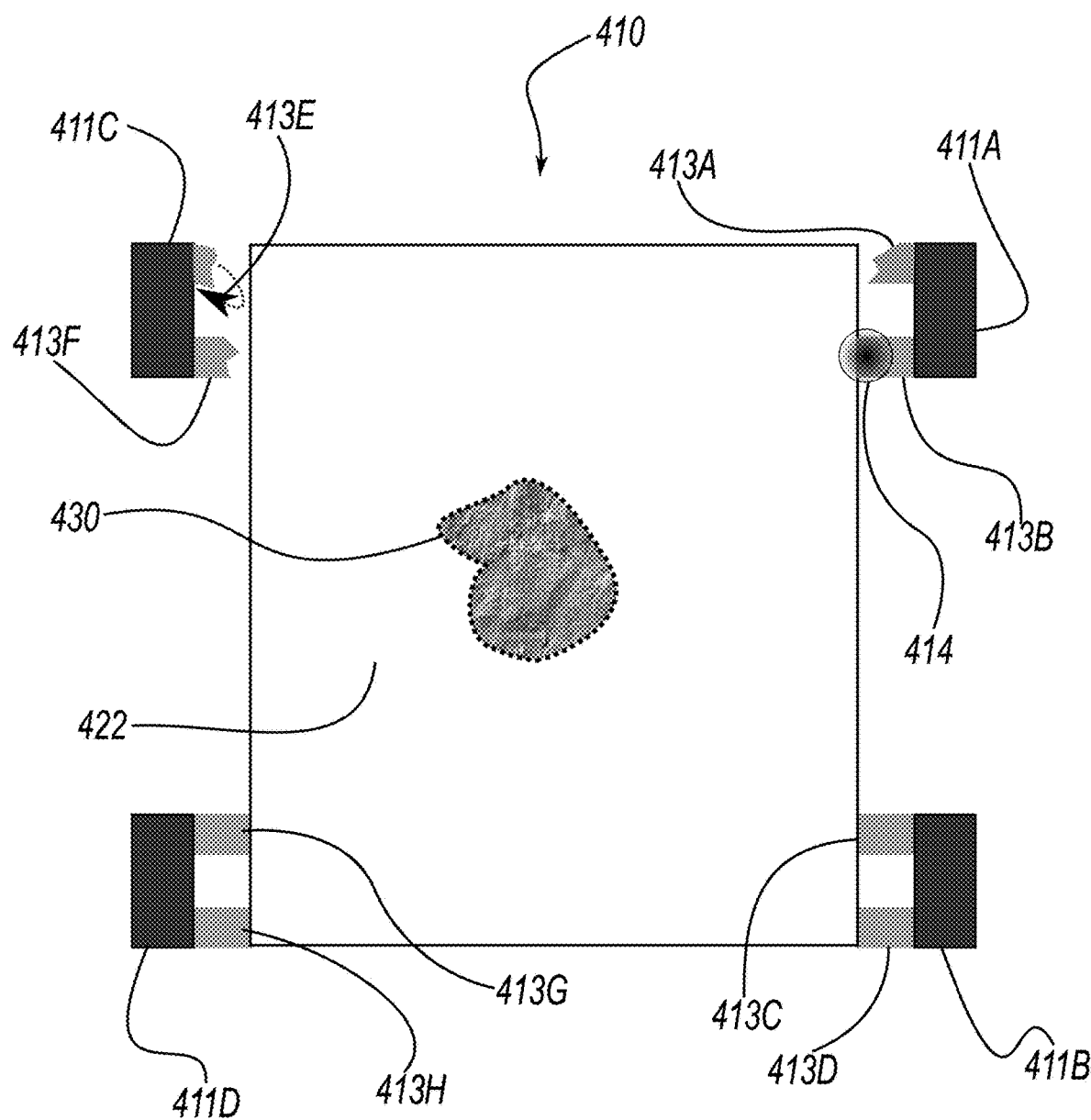
FIG. 4 illustrates a top-down view of a build plate system wherein tabs attach the sheets to a frame having four posts.

Referring to FIG. 4, another embodiment of the build plate system 410 is shown. Here, the build plate system 410 includes a frame having four posts 411A-411D. It should be understood that the frame may take any one of a number of different designs. In this embodiment, the frame has four posts 411A-411D. However, it is possible that the frame could be a U-shaped frame as described in FIG. 3.

Here, the posts 411A-411D are connected to the sheet 422 upon which the object 430 is printed using tabs 413A-413H. As such, each post has two tabs connecting the post to the sheet 422. So, for example, post 411B has tabs 413C and 413D connecting the post 411 be to the sheet 422. It should be understood that any number of tabs may be utilized. So, for example, each post may only have one tab connecting the post to the sheet 422 or may have more than one tab.

The tabs 413A-413H are such that they can be disconnected from the sheet 422. For example, the tabs 413A-413H may be break-away tabs that are simply used to hold the sheet 422 within the frame. The nozzle 414 of the three-dimensional printer may be utilized to essentially break the tabs from the posts. In this embodiment, the nozzle 414 has been used to break the tabs 413E, 413F, and 413A. At this exact moment that this figure represents, the nozzle 414 is positioned so as to break tab 413B.

Once all the tabs 413A-413H have been broken by the nozzle 414, the sheet 422 can be ejected from the frame using any one of a number of different methodologies, including those methodologies disclosed in this specification. For example, the sheet 422 could be ejected by a spring or could be ejected by gravity, etc.

Referring to FIGS. 5A-5E, another embodiment of the build plate system 510 is shown. In this embodiment, the concavities 532A and 532B include hot melt adhesive 550A and 550B, as do similar concavities located on each sheet in the plurality of sheets 518. This hot-melt adhesive is shown in a close-up as the densely shaded region 550A in FIG. 5A. It should be further understood that the build plate system 510 may not include the concavities 532A and 532B and the hot melt adhesive may simply be deposited directly on an area of the plurality of sheets 518, so no concavity would be present.

Figure 5C:
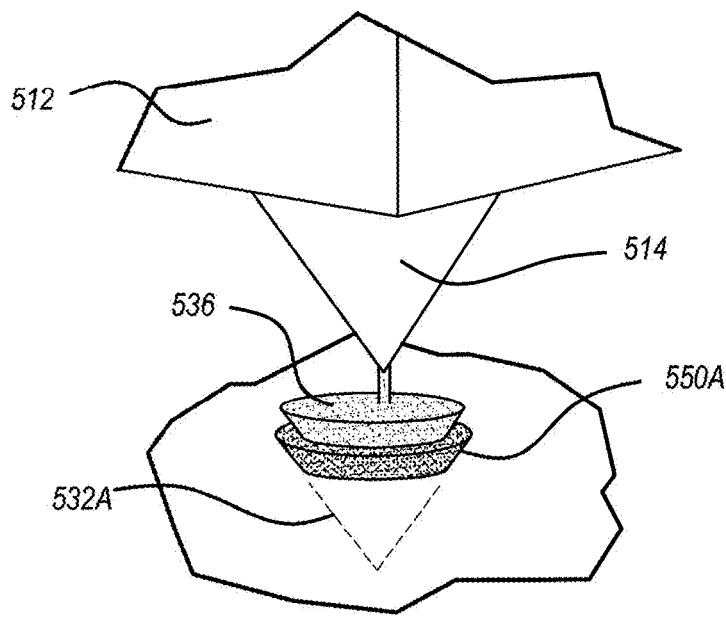
Figure 5D:
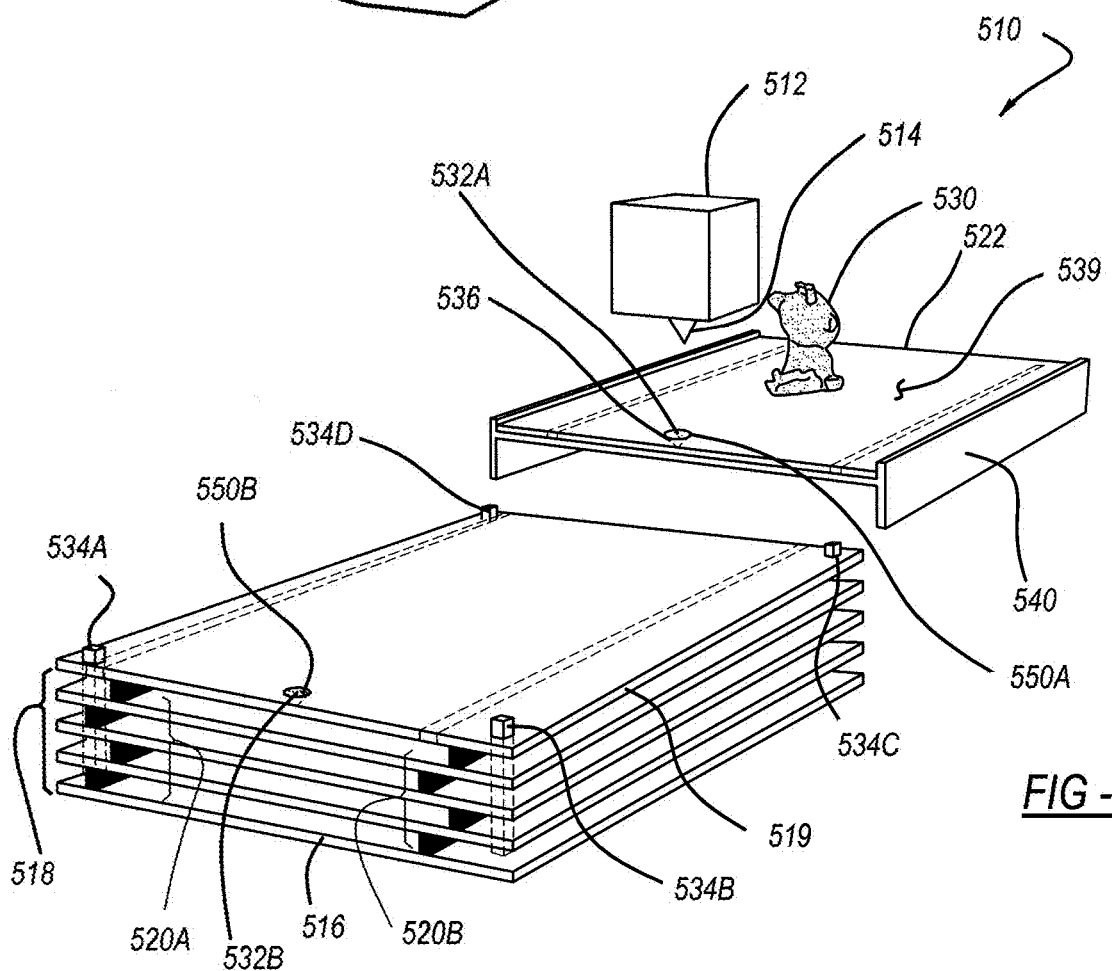

In this embodiment, the nozzle 514 is directed to come into contact with the hot melt adhesive 550A after printing object 530 and releasing the top most sheet 522 in the previously discussed methods. The heat of the nozzle softens and activates the hot melt adhesive, thereby bonding the nozzle 514 to the top most sheet 522. The base plate 516 and/or the nozzle 514 are configured to lift the top most sheet 522 as shown in FIG. 5B. Then the top-most sheet 522 may be moved laterally and released onto a target area, as shown in FIG. 5D. Note that this removal mechanism allows for the inclusion of posts 511A-511D, which prohibit lateral movement of the top-most sheet 522 when it is on the stack 519. The target area 539 may include a conveyor belt system or track 540. The nozzle 514 may be configured to release the top most sheet 522 by either heating the nozzle 514 to a temperature such that it completely melts the hot melt adhesive 550A. Optionally, the nozzle 514 may release the top-most sheet by dispensing some additional material 536 from the nozzle so as to release the top most sheet 522 from the nozzle 514, as shown in a close-up in FIG. 5C.

Figure 5E:
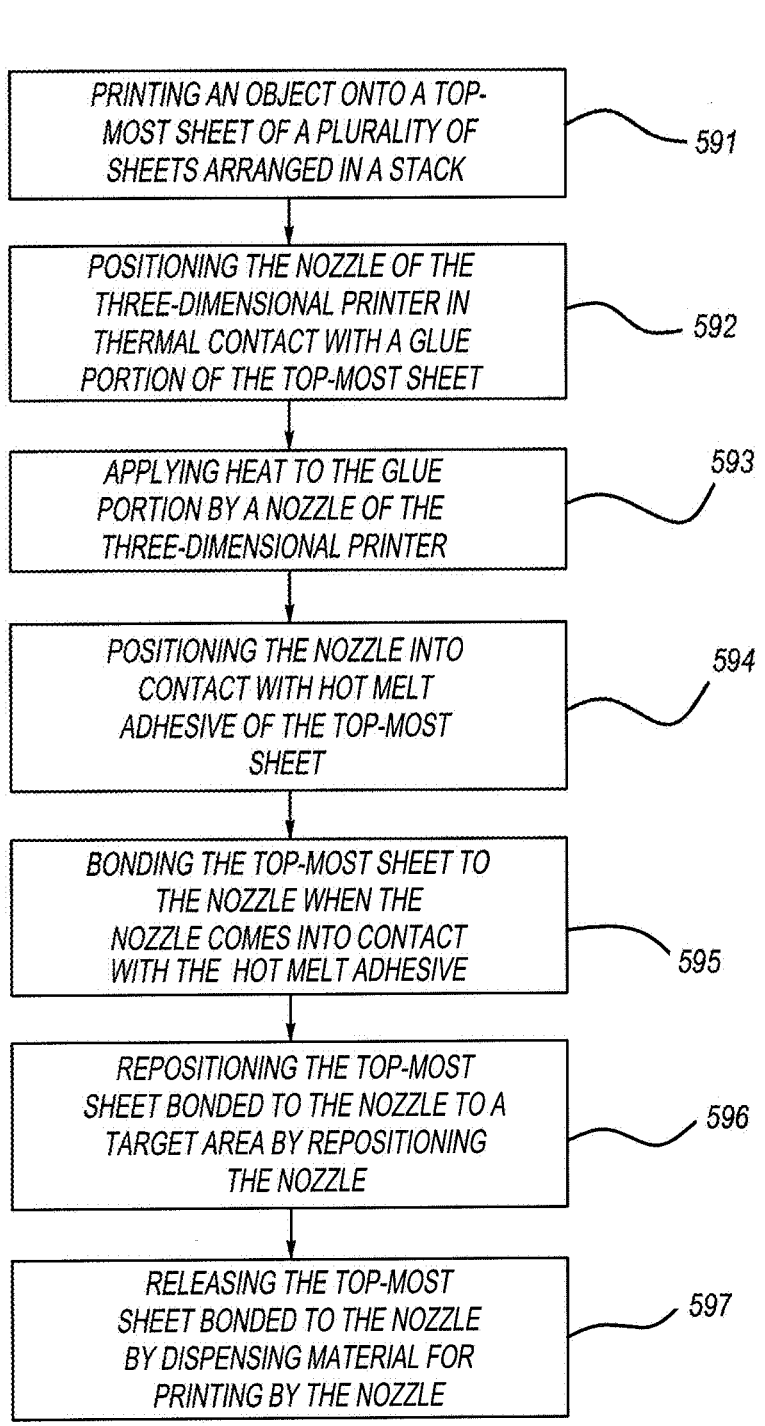
FIG. 5E illustrates a method for operating the build plate system of FIGS. 5A-5D.

Referring to FIG. 5E, a method 590 for operating the build plate system disclosed in FIGS. 5A-5E is shown. In step 591, the nozzle prints the object 530 on to the top most sheet 522 of a plurality of sheets 518. After that, in step 592, the nozzle 514 is positioned to be in thermal contact with the glue portions 520A and 520B of the top most sheet. In step 593, heat is applied to the glue portion by the nozzle 514 of the printer so as to release the top most sheet 522 from the stack 519.

Thereafter, in step 594, the nozzle 514 is positioned to be in contact with the hot melt adhesive 550A of the top most sheet 522. In step 595, the top most sheet 522 is then bonded to the nozzle 514 when the nozzle 514 comes into contact with the hot melt adhesive 550A. In step 596, the top most sheet 522 is repositioned to a target area by repositioning the nozzle 514. Finally, in step 597, the top most sheet 522 is released by dispensing material 536 for printing by the nozzle 514. Optionally, the nozzle 514 may apply additional heat to further soften the hot melt adhesive and promote the releasing of the top most sheet 522 from the nozzle 514.

Figure 6:
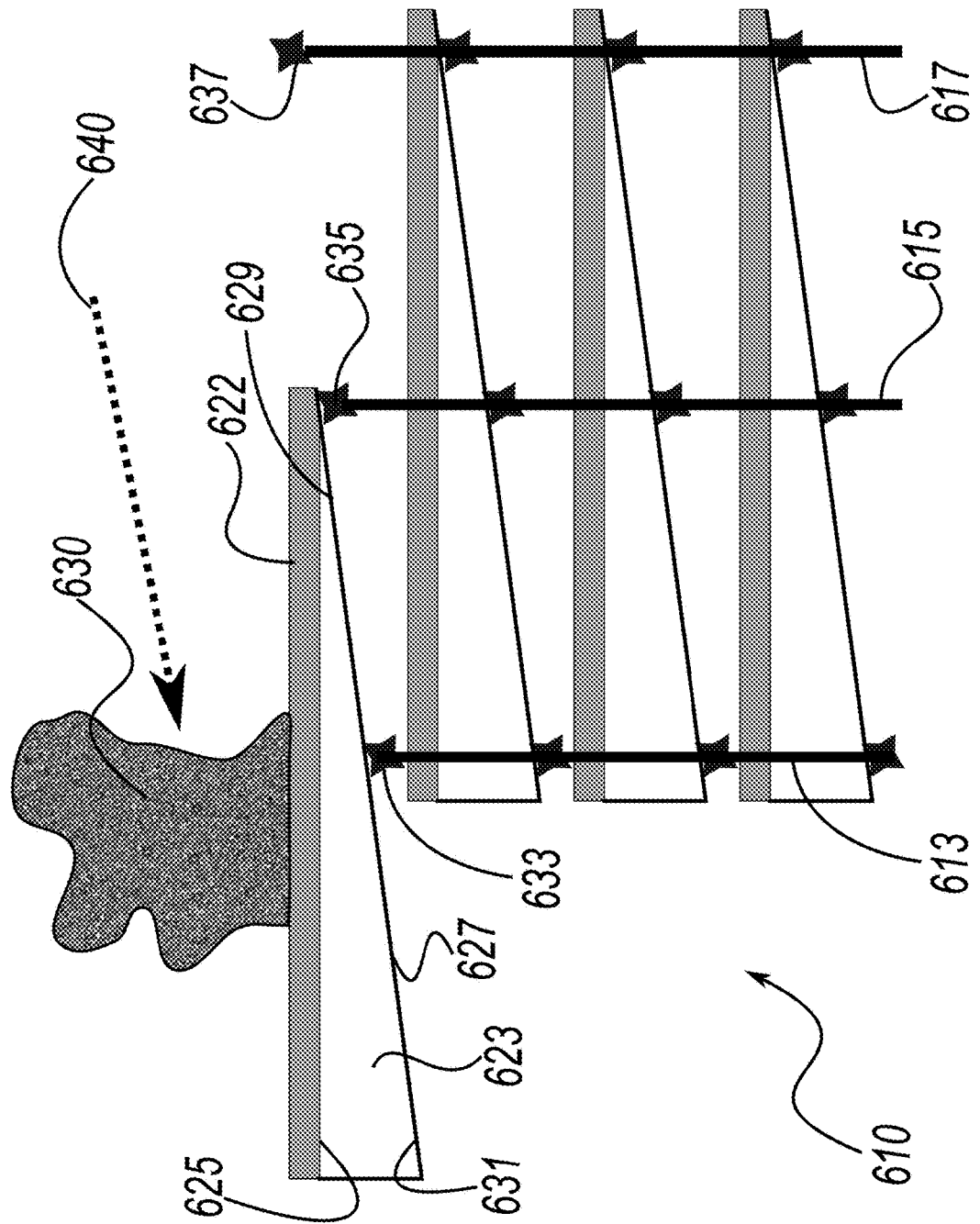
FIG. 6 illustrates a side view of a build plate system with a removal means wherein the sheets slide off the stack by means of gravity.

Referring to FIG. 6, another embodiment of the build plate system 610 is shown. Here, the build plate system includes a top most sheet 622 wherein the printed object 630 has been deposited thereon. The build sheet 622 is located on wedge shaped platform 623. The wedge shaped platform from the side may generally represent a right angle triangle. The wedge shaped platform 623 has a top surface 625 for supporting the build sheet 622. In addition, the platform 623 also includes an angled side 627. Generally, a first end 629 of the angled side 627 is located very near the build sheet 622. The other side 631 of the angled side 627 is generally farther away from the build sheet 622, so as to form a ramp.

Rollers 633, 635, and 637 allow for gravity to move the platform 623 and thus the build sheet 622 and the printed object 630 in the direction indicated by the arrow 640. The rollers 633, 635, and 637 may include some form of locking mechanism so as to allow for or prevent the movement of the platform 623 and thus the sheet 622 and the printed object 630. The rollers are supported by posts on either side, drawn in this figure as 613, 615, and 617. It should be understood that the perspective of this drawing only allows the nearest three of the six posts to be visible, as the posts supporting the far side of the rollers 633, 635, and 637 are obscured by posts 613, 615, and 617.

In this embodiment, the system 610 shows four separate build sheets with four separate platforms each with corresponding rollers. It should be understood that any number of platforms, build sheets and/or rollers may be utilized and stacked in a vertical fashion so as to allow the mass production of 3D printed objects on the multiple build sheets.

Figure 7A:
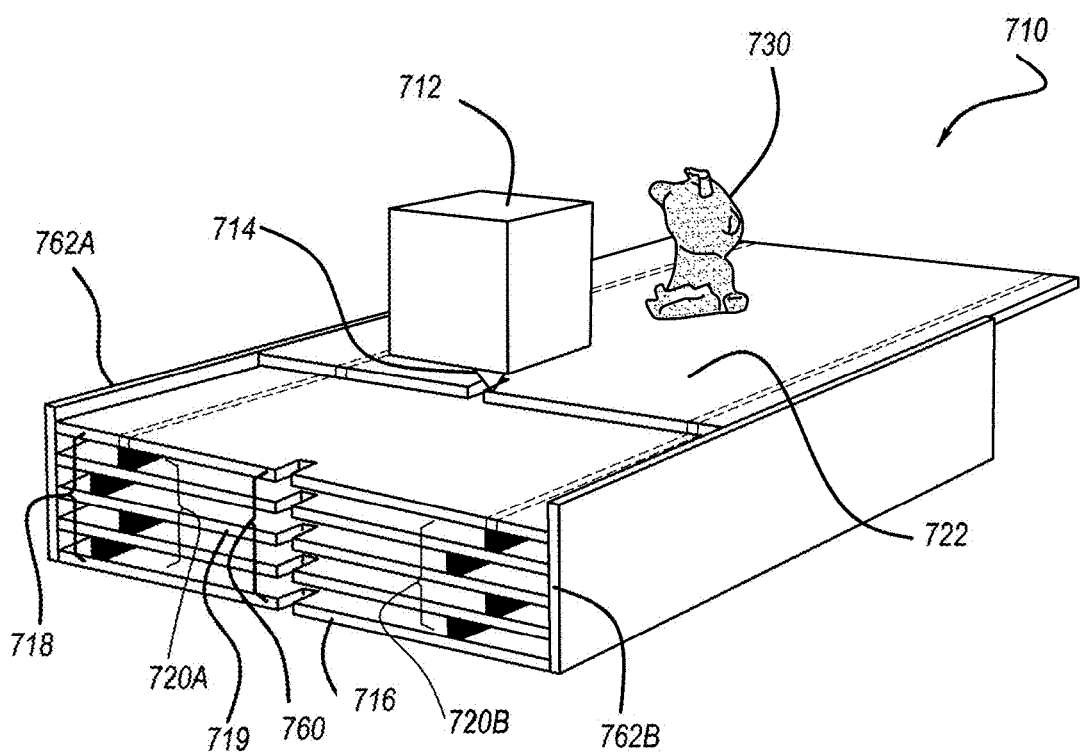
FIG. 7A illustrates a build plate system with a removal means wherein the top-most sheet is pushed through a slot by the nozzle off of the stack into a target area.
Figure 8A:
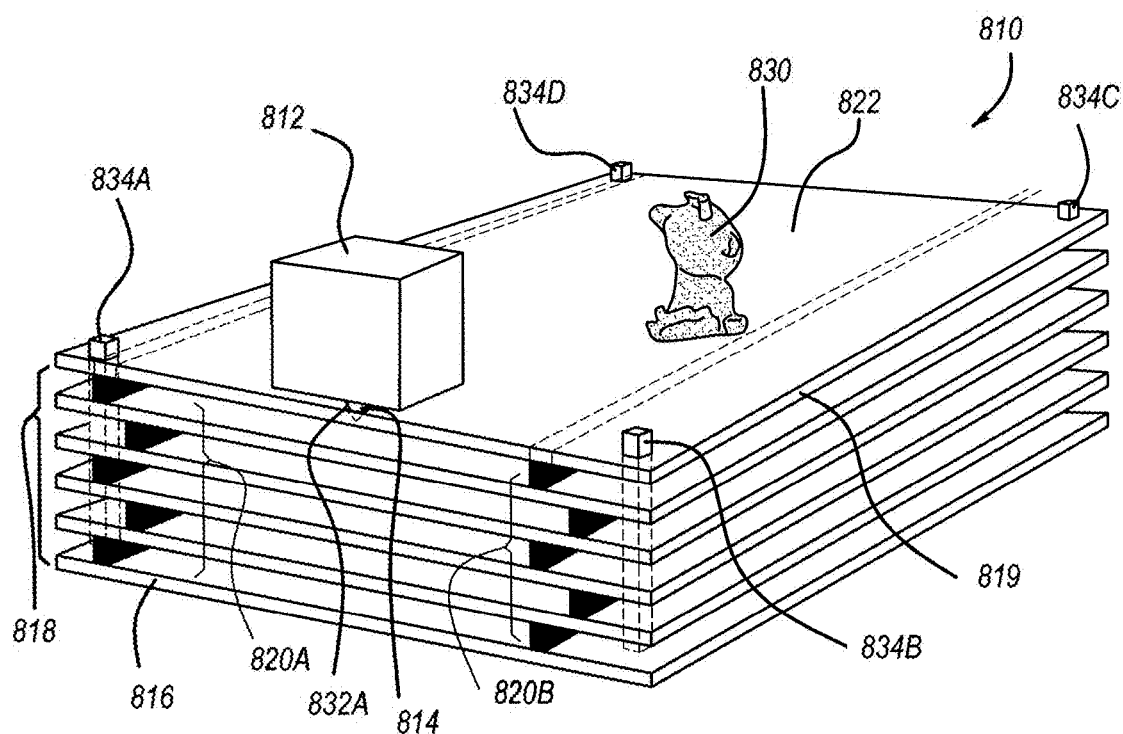
FIGS. 8A-8E illustrate a build plate system with a removal means wherein the top-most sheet is bonded to the nozzle by allowing the nozzle and dispensed material to cool.

Referring to FIG. 7A, another embodiment of the build plate system 710 is shown. In this embodiment, each of the plurality of sheets 718 in the stack includes a notch 760. In this embodiment, the notch 760 is substantially U shaped. However, in this embodiment, it should be understood that the plurality of sheets 718 may not include the notch 760, and an edge of each of the plurality of sheets 718 may be used to the same effect. Alternatively, the notch 760 may constitute a hole or concavity in the interior of each of the plurality of sheets 718, such as the concavities 832A and 832B illustrated in FIGS. 8A-8C. The notch 760 may be any one of a number of shapes.

Also, opposing walls 762A and 762B are located on edges of the stack 719 so as to allow the movement of the top most sheet 722 laterally in one direction and restrict the lateral motion of the top most sheet 722 in the perpendicular direction. In this embodiment, after the nozzle 714 has finished printing the object 730 and releasing the top most sheet 722 from the stack 719, the nozzle is moved to the notch 760 of the top most sheet 722. After that, the nozzle 714 is configured to move the top most sheet 722 laterally in a direction opposite to the open end of the notch 760. More specifically, the nozzle 714 comes in direct mechanical contact with the bottom of the U of the notch 760 and then pushes the top most sheet 722 into a target area. In the case no notch 760 is present, the nozzle 714 would come into direct mechanical contact with an edge of the top most sheet 722 and then push the top most sheet 722 into the target area.

Figure 7B:
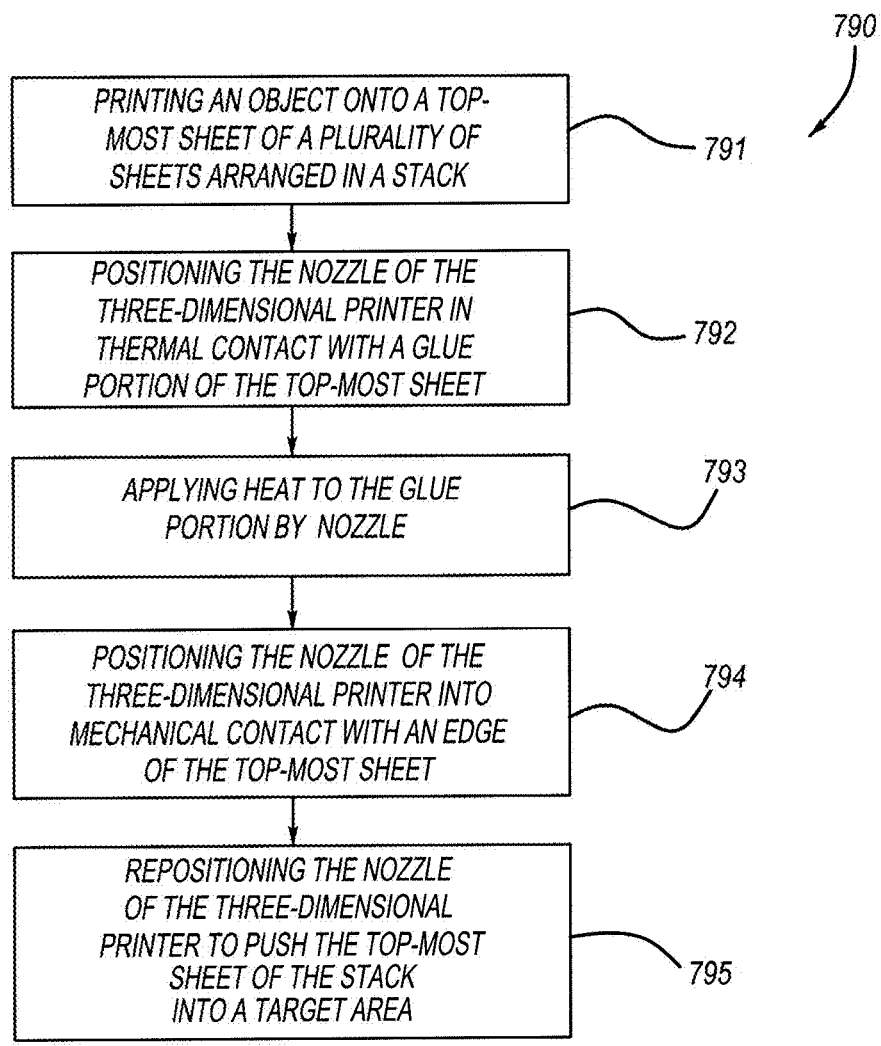
FIG. 7B illustrates a method for operating the build plate system of FIG. 7A.

Referring to FIG. 7B, the method 790 for the embodiment described in FIG. 7A is shown. In step 791, an object 730 is printed on the top most sheet 722 of a plurality of sheets 718 arranged in the stack 719. After that, in step 792, the nozzle 714 of the three-dimensional printer is placed in thermal contact with the glue portions 720A and 720B of the top most sheet 722. In step 793, heat is applied to the glue portions 720A and 720B by the nozzle 714, releasing top most sheet 722 from the stack 719.

In step 794, the nozzle 714 is positioned into mechanical contact with an edge of the top most sheet 722. As shown in FIG. 7A, the edge may, in fact, include a notch 760. However, instead of a notch 760, the nozzle 714 may simply be placed in contact with an edge of the top most sheet 722. Thereafter, in step 795 the nozzle 714 is repositioned so as to push the top most sheet 722 off the stack 719 into a target area.

Figure 8B:
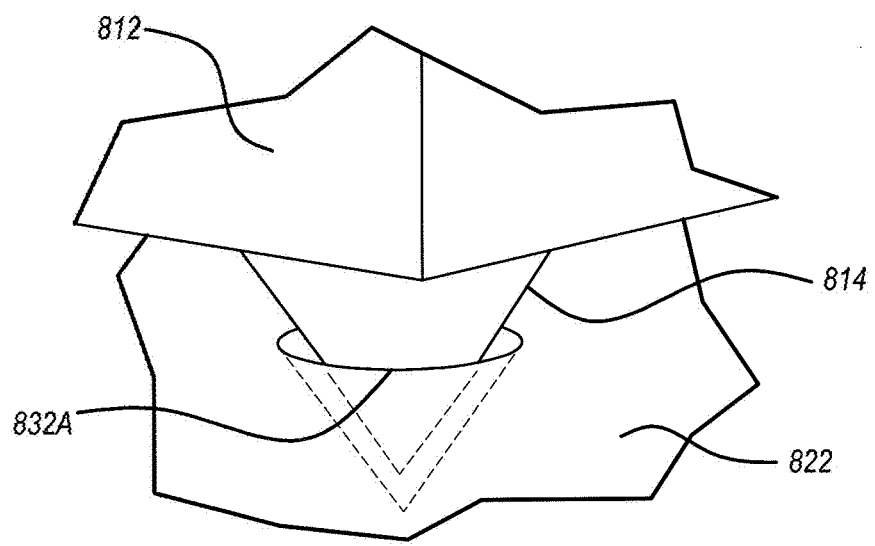
Figure 8C:
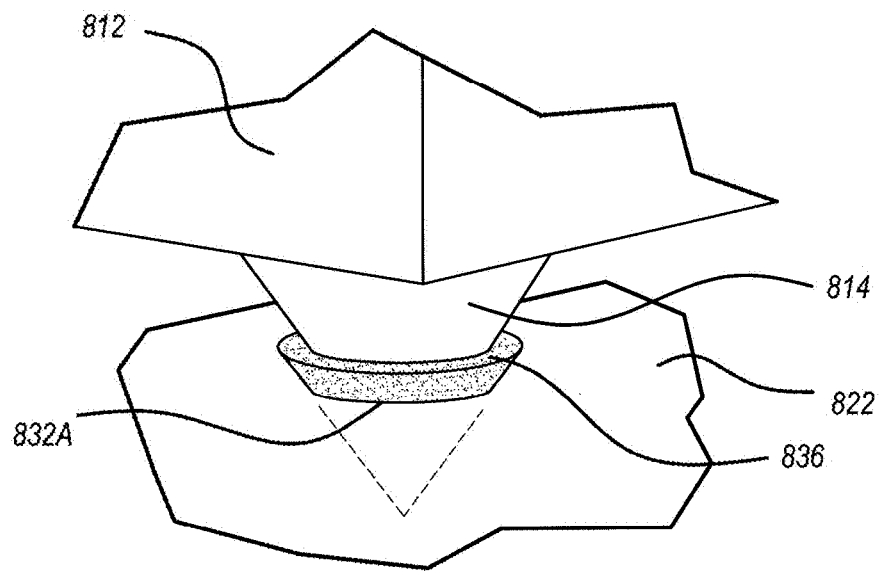

Referring to FIGS. 8A-8E, another embodiment of the build plate system 810 is shown. Here, the build plate system 810 includes posts 834A-834D extending from the base sheet 816 near the corners of the plurality of sheets 818 configured to secure the sheets 818 to the stack 819 laterally. Each of the sheets 818 includes a small concavity 832A and 832B. While only two concavities 832A and 832B are shown, it should be understood that each of the plurality of sheets 818 has a concavity. As best shown in FIG. 8B, the concavity 832A may be conical in shape so as to mate with the nozzle 814 of the three-dimensional printer. In this embodiment, after the nozzle 814 has heated the glue portions 820A and 820B so as to release the top most sheet 822 from the stack 819, the nozzle 814 is directed to either come into contact or near contact with the concavity 832A, as shown in FIG. 8B. Here, the nozzle 814 outputs an amount of build material 836, as shown in FIG. 8C, so as to bond the nozzle 814 to the top most sheet 822 once the build material 836 has sufficiently cooled.

Figure 8D:
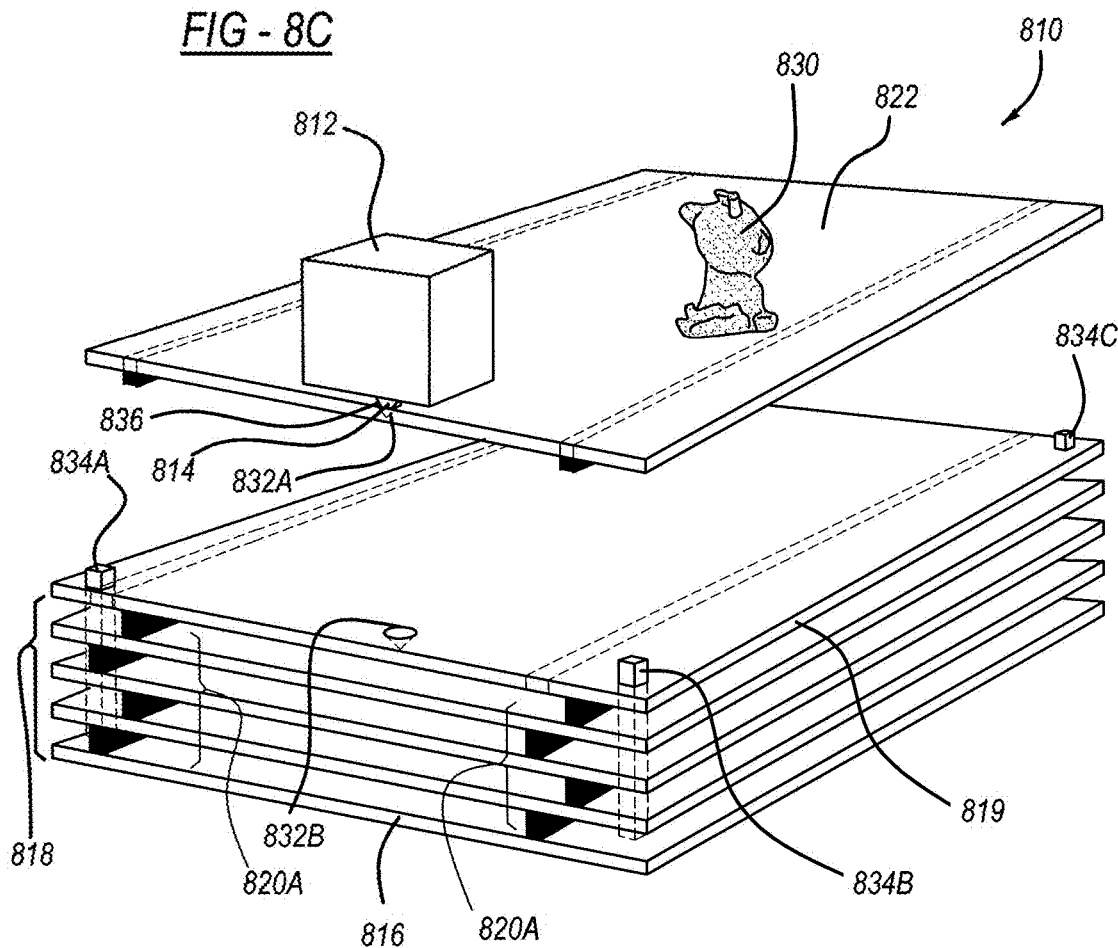

After that, the top most build sheet 822 is removed from the stack 819 by moving the base sheet 816 and/or the structure 812, and therefore the nozzle 814, as shown in FIG. 8D. The top most sheet 822 can then be moved to a target area. Once the sheet 822 has been moved to the target area, the top most sheet 822 can be released from the nozzle 814 by either heating the nozzle 814 to a certain temperature so as to melt the build material 836 bonding the nozzle 814 to the top most sheet 822 and/or dispensing additional material from the nozzle 814 so as to dislodge the nozzle 814 from the top most sheet 822.

Figure 8E:
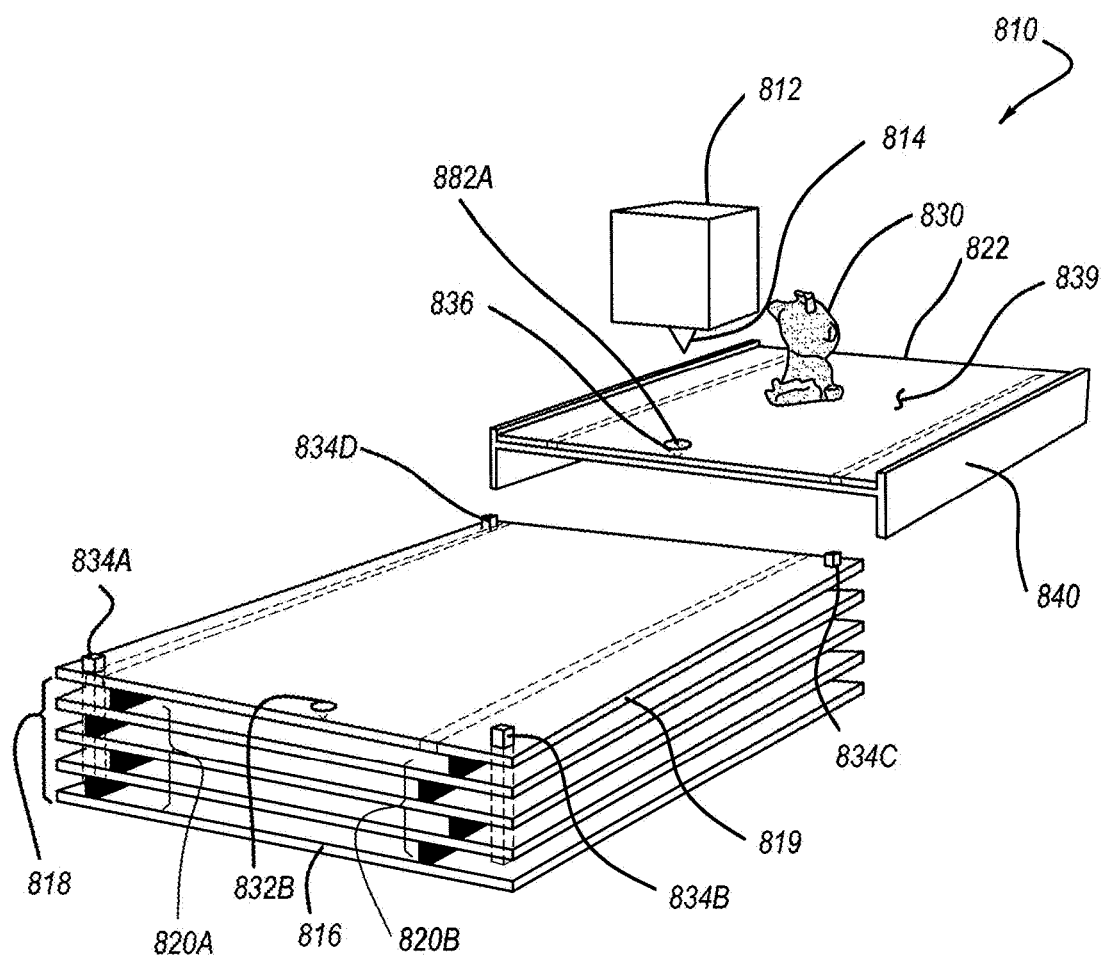

As illustrated in FIG. 8E, the target area 839 may include a conveyor belt system or track 840 so as to transport the object 830, and the top most build sheet 822 to another station for additional manufacturing for processing. Printed parts and used sheets are repositioned into a target area, forming one end of a queue of previously completed objects and used sheets. This may, in turn, form the beginning of an assembly line that feeds the used sheets into other stations or machines that modify the printed part into a finished product.

Figure 8F:
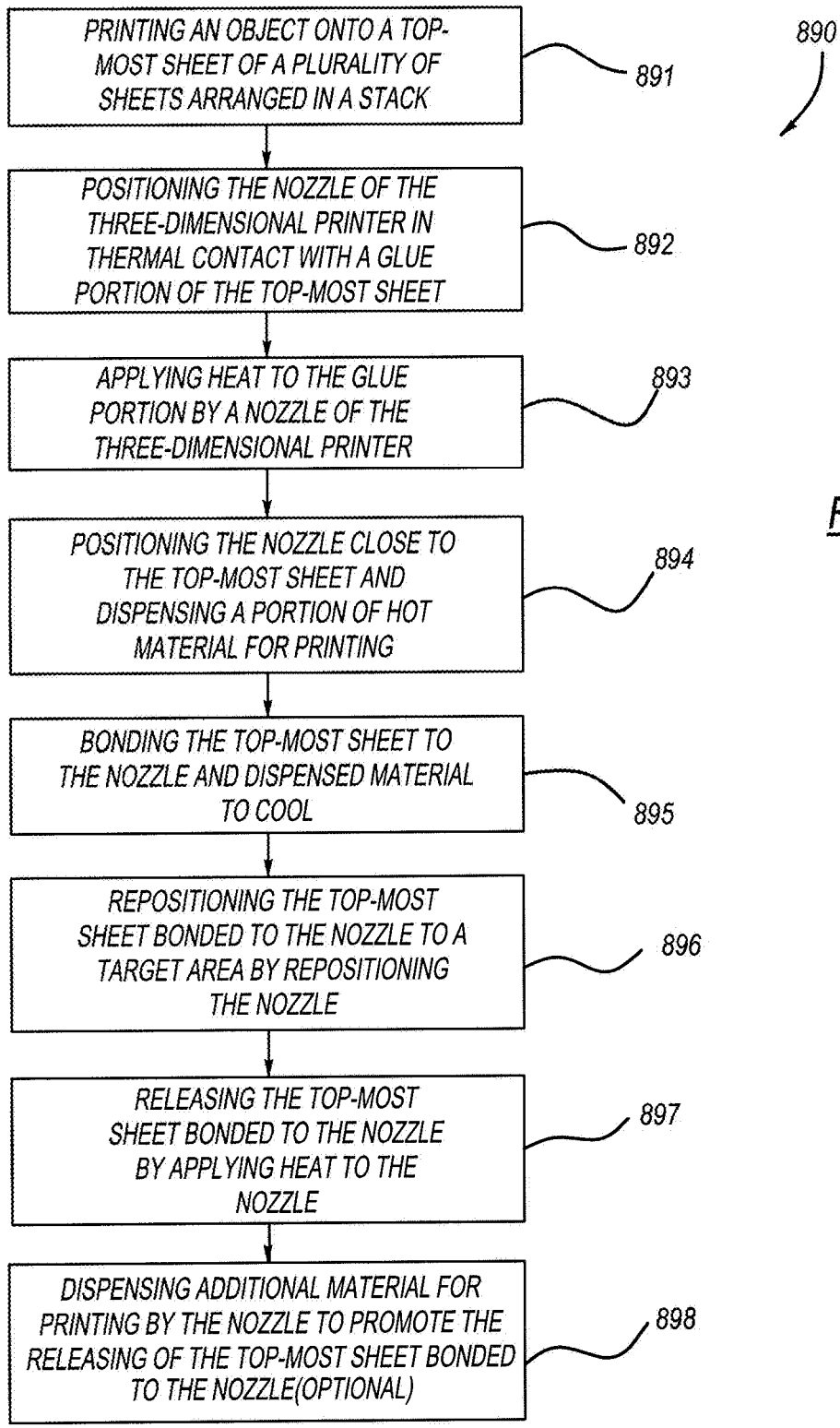
FIG. 8F illustrates a method for operating the build plate system of FIGS. 8A-8E.

FIG. 8F illustrates a method 890 for operating the build plate system described in FIGS. 8A-8E. This methodology may be incorporated into the software 128 so as to configure the control module 124 to perform this operation. In step 891, the object 830 is printed onto the top most sheet 822 of the plurality of sheets 818 arranged in the stack 819. Afterward, in step 892, the nozzle 814 is positioned so as to be in thermal contact with the glue portions 820A and 820B of the top most sheet 822. After that, in step 893, heat is applied to the glue portions 820A and 820B by the nozzle 814, thereby releasing the top most sheet 822 from the stack 819.

Next, in step 894, the nozzle 814 is positioned close to the top most sheet 822. As stated previously, close to the top most sheet 822 may have a concavity 832A. After that, a portion of hot material 836 for printing is dispensed by the nozzle 814. In step 895, the top most sheet 822 is bonded to the nozzle 814 by allowing the dispensed material 836 to cool.

In step 896, the top most sheet 822 is repositioned to a target area 839 by repositioning the nozzle 814. After that, in step 897, the top most sheet bonded to the nozzle is released by applying heat to the nozzle 814. Optionally, in step 898, the nozzle 814 may dispense additional material to promote the releasing of the top most sheet 822 from the nozzle 814.

In an alternative embodiment, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. A build plate system for a heated deposition three-dimensional printer, the system comprising:
    a plurality of sheets, the plurality of sheets arranged in a stack on a build plate;
    an attachment means for holding each sheet to the stack;
    wherein the attachment means is configured to release a top sheet from the stack by action of a nozzle of the three-dimensional printer;
    a removal means for transporting each sheet off the stack; and
    wherein the removal means is configured to reposition the released top sheet from top of the stack onto one or more target areas by action of itself or a nozzle of the three-dimensional printer.

2. The system of claim 1, wherein the plurality of sheets are rectangular in shape.

3. The system of claim 1, wherein the plurality of sheets are made of a rigid material.

4. The system of claim 1, wherein a heated deposition three-dimensional printer nozzle is positioned by moving the nozzle or the build plate.

5. The system of claim 1, wherein an upper surface of each sheet is configured to maximize adhesion with a material for printing.

6. The system of claim 1, wherein each sheet can be cut with scissors or a laser cutter, allowing a printed object to be separated from a bulk of a used sheet.

7. The system of claim 1, wherein each sheet is configured to be semi-rigid or can be made to flex, allowing a printed object to be separated from a used sheet by bending the used sheet.

8. The system of claim 1, further comprising a rigid frame configured to secure the sheets to the stack laterally.

9. The system of claim 1, wherein the attachment means comprises a glue portion; and wherein glue of the glue portion is configured to release the top sheet from the stack when receiving heat from a nozzle of the three-dimensional printer.

10. The system of claim 9, wherein each glue portion between each of the plurality of sheets alternates between a plurality of different areas of the sheets.

11. The system of claim 9, wherein the glue comprises cyanoacrylate, methacrylate, hot melt, or another heat-sensitive adhesive.

12. The system of claim 9, wherein each sheet further comprises:
    v-shaped grooves; and
    wherein the glue portion between each sheet is located between the v-shaped grooves for maximizing thermal contact with a nozzle of the three-dimensional printer.

13. The system of claim 1, wherein the attachment means comprises:
    at least one mechanical latch; and
    wherein the latch is configured to release the top sheet from the stack when force is applied via a nozzle of the three-dimensional printer.

14. The system of claim 1, wherein the attachment means comprises:
    at least one tab; and
    wherein that tab is configured to break and release the top sheet from the stack upon receiving heat and force from a nozzle of the three-dimensional printer.

15. The system of claim 1, wherein the removal means comprises:
    a portion of hot melt adhesive located on each of the plurality of sheets, the hot melt adhesive configured to bond the sheet to a nozzle of the three-dimensional printer when the nozzle comes into contact with the hot melt adhesive; and
    wherein the sheet is configured to release from the nozzle when the nozzle dispenses the material for printing.

16. The system of claim 15, wherein the portion of hot melt adhesive is located within a concavity in each of the plurality of sheets for maximizing adhesion with a nozzle of the three-dimensional printer.

17. The system of claim 1, wherein the removal means comprises:
    areas of mechanical contact between consecutive sheets which are positioned at an incline with respect to horizontal; and
    whereby allowing gravity slides the released top sheet off the stack into a target area.

18. The system of claim 1, wherein the removal means comprises:
    a substantially horizontal slot allowing each released sheet to slide laterally; and
    whereby a nozzle of the three-dimensional printer is positioned into mechanical contact with the top sheet and is then repositioned to push the top sheet off of the stack.

19. The system of claim 1, wherein the removal means comprises one or more springs configured to push the top most sheet off of the stack when it is detached from the stack.

20. The system of claim 19, wherein there is one set of springs that only operates on the top most sheet, and this set of springs is re-cocked to the next sheet by action of a nozzle of the three-dimensional printer.

21. The system of claim 1, further comprising a track located adjacent to the three-dimensional printer, wherein printed parts and used sheets are repositioned off the stack and to a target area, forming one end of a queue of previously completed objects and used sheets.

22. The system of claim 21, wherein the track for the used sheets feeds into a rack for storing printed parts.

23. The system of claim 21, wherein the track for the used sheets comprises a beginning of an assembly line that feeds the used sheets into other stations or machines that modify the printed part into a finished product.

24. The system of claim 1, further comprising:
a control module configured to control the three-dimensional printer, the control module being configured by software for controlling the three-dimensional printer;
the control module configured to generate by pre-existing software commands to control the printing of an object;
the control module configured to generate initial commands to change a height of the build plate system to account for a number of used sheets; and
the control module configured to generate commands after the object has finished printing to release the sheet from the stack through action of the nozzle.

25. A method of operating a build plate system for a heated deposition three-dimensional printer, the method comprises the steps of:
positioning a nozzle of the three-dimensional printer into contact with a hot melt adhesive of a top-most sheet of a plurality of sheets arranged in a stack;
bonding the top-most sheet to the nozzle when the nozzle comes into contact with the hot melt adhesive;
repositioning the top-most sheet bonded to the nozzle to a target area by repositioning the nozzle; and
releasing the top-most sheet bonded to the nozzle by dispensing material for printing by the nozzle.

26. The method of claim 25, further comprising the step of initially positioning the nozzle into a concavity of the top-most sheet to allow for maximum adhesion of the hot material for printing with the nozzle.

27. The method of claim 25, further comprising the step of dispensing additional material for printing by the heated nozzle to promote the releasing of the top-most sheet bonded to the nozzle.

* * * * *